(No Model.)

W. A. CHILDS & F. SHAW.
GALVANIC BATTERY.

No. 255,597. Patented Mar. 28, 1882.

Witnesses.

Inventors,
William A. Childs,
Frank Shaw,
by their Attorney,

UNITED STATES PATENT OFFICE.

WILLIAM A. CHILDS, OF ENGLEWOOD, NEW JERSEY, AND FRANK SHAW, OF NEW YORK, N. Y.

GALVANIC BATTERY.

SPECIFICATION forming part of Letters Patent No. 255,597, dated March 28, 1882.

Application filed May 10, 1881. (No model.)

*To all whom it may concern:*

Be it known that we, WILLIAM A. CHILDS and FRANK SHAW, citizens of the United States, residing respectively at Englewood, in the county of Bergen and State of New Jersey, and in the city, county, and State of New York, jointly have invented certain new and useful Improvements in Galvanic Batteries, of which the following is a specification.
Our invention more especially relates to that class of galvanic batteries in which a solution of sal-ammoniac or other kindred salt is used as the excitant. Our improvements have especial reference to the organization of the battery.

The object of our invention is to provide a serviceable, cheap, and cleanly galvanic cell, to prevent the corrosion of its parts and the deliquescence and effloresence of its contents, to guard against the spilling and evaporation of the liquid and the escapement of obnoxious gases, and in general to furnish an instrument free from the objections common to other batteries, and adapted as well for use in dwelling-houses as in the laboratory.

The subject-matter claimed is hereinafter specifically designated. We obtain these results, the best way now known to us, in the galvanic cell illustrated in the accompanying drawings, in which—

Figure 2:
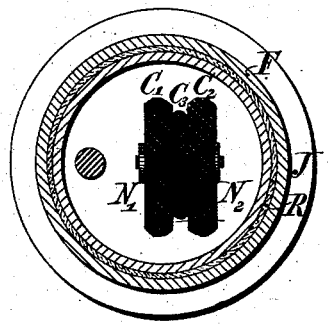
Figure 3:
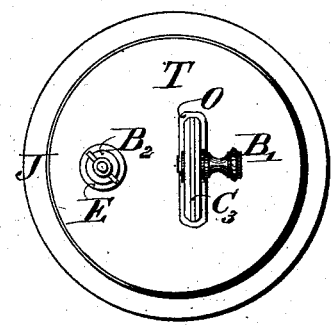
Figure 1:
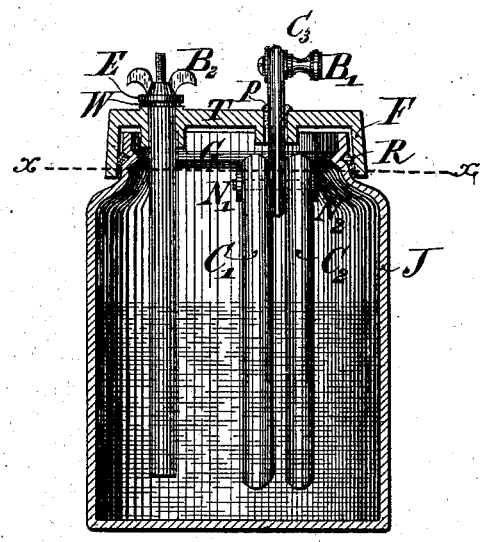

Figure 1 is a vertical section, showing the electrodes in elevation. Fig. 2 is a horizontal section on the line $x\ x$ of Fig. 1, and Fig. 3 a plan or top view.

The battery-jar J, preferably of glass, in shape closely resembles an ordinary fruit-jar, its neck being provided with a circumferential groove, G, in which a rubber band, R, closely fits as a gland or packing.
The lid or cover T is made of glass or other suitable non-conducting material, and is provided with a flange, F, which fits upon the elastic packing-ring R. The pressure exerted by the flange F upon the band R increases as the cover is depressed, in consequence of the conical shape given to the inner surface of the flange.

The electro-negative pole is formed of two plates of carbon, $C'$ and $C^2$, having the planes of their faces parallel. They are securely connected near their upper ends to a smaller central carbon plate, $C^3$. The three plates may be connected together in any suitable manner. For cheapness and efficiency we prefer a single stout rivet of hard rubber with nuts $N'$ and $N^2$ screwed respectively on each end, and serving to bind the plates together with sufficient pressure to insure a perfect electrical connection. We also deem it prudent to impregnate the central plate throughout with paraffine or other like substance to prevent the solution from rising within its pores by capillary action. The central plate, $C^3$, passes through a flanged opening or aperture, O, in the cover T, in which it is securely fastened by pitch, sealing-wax, or other cement. The latter serves not only to rigidly attach the electro-negative pole to the cover T, so that it may be removed from the cell by lifting the cover, but also to hermetically seal the opening O, and thereby prevent the passage of gases or liquid through the same.

Electrical connections with the negative pole are made by the binding-post $B'$, attached to the part of the central plate which extends above the cover.

The positive pole is a cylindrical bar of amalgamated zinc, one-half inch, more or less, in diameter, which passes through a circular opening in the cover T. It is supported by a flange or enlargement, E, beneath which is placed a circular ring of rubber or other suitable washer, W, serving to cork or inclose the orifice, and to cushion the shoulders E when resting on the cover T. The binding-nut $B^2$ connects the pole to any external conductor, and also serves as a handle by which to remove the pole from the jar. The jar, when charged with sal-ammoniac and water, is ready for use.

We claim as our joint invention—

1. The combination of the non-conducting cover, the detachable zinc electrode passing through the aperture in the cover and provided with the flange or enlargement above the cover, and a washer between said flange and cover, substantially as and for the purpose herein set forth.

2. The compound carbon element constructed, substantially as herein set forth, of two or more plates of carbon clamped at their upper ends to a conducting and supporting plate of carbon impregnated with paraffine or other like substance.

3. The combination, substantially as hereinbefore set forth, of the jar, the non-conducting cover, and the carbon electrode inserted in the aperture of the cover, and composed of the impregnated central or supporting plate, and the plates connected thereto by the hard-rubber rivet.

In testimony whereof we have hereunto subscribed our names this 9th day of May, A. D. 1881.

WM. A. CHILDS.
FRANK SHAW.

Witnesses:
  W. D. BALDWIN,
  MILLER C. EARL.